United States Patent Office 2,813,136
Patented Nov. 12, 1957

2,813,136

TREATMENT OF POLYMERS PRODUCED BY ALKALI METAL CATALYZED POLYMERIZATION

Clyde W. Mertz, Bartlesville, Okla., assignor to Phillips Petroleum Company, a corporation of Delaware No Drawing. Application December 18, 1953, Serial No. 399,167

8 Claims. (Cl. 260—666)

This invention relates to the treatment of hydrocarbons to remove alkali metal impurities therefrom. In one aspect this invention relates to the removal of alkali metal impurities from polymers, produced by alkali metal catalyzed polymerization of a diene, by treatment of the polymer with an aqueous agent such as water, an aqueous acid, or an aqueous alcohol, in the presence of an emulsion-breaker. In one aspect this invention relates to a method for effecting recovery of a low ash liquid polymer product, from an alkali metal catalyzed diene polymerization, by treating the said polymer product with an aqueous agent in the presence of an emulsion-breaker, thereby providing for an efficient separation and recovery of polymer product of high purity. In one aspect this invention relates to an alkali metal catalyzed solution polymerization of 1,3- butadiene to form liquid polymer, and to the removal of alkali metal impurities from resulting polymer-containing solution, by contacting the latter under agitation contitions with an aqueous treating agent such as an aqueous alcohol, an aqueous acid, or water, in the presence of an emulsion-breaker, or de-emulsifier.

The polymerization of dienes, such as 1,3-butadiene, in the presence of alkali metals, such as sodium, potassium or lithium, in the presence or absence of a solvent, is well known. Solid or liquid polymers may be produced using these catalysts; liquid polymers are readily formed by operating at relatively high temperatures with a suitable solvent, such as benzene, heptane or the the like to obtain a solution of liquid polymer in the solvent.

In the alkali metal polymerization of conjugated dienes and the like, it is necessary to treat the resulting reaction mixture in some manner to convert the alkali metal and reactive alkali metal organic compounds present to prevent further catalytic effect of the alkali metal on the product. Alkali metal catalysts are harmful if left in the product because they promote cross-linking of the polymer with concomitant formation of gel. Alkali metal hydroxides left in the polymers are deleterious for many uses of such polymers. For instance, a low molecular weight polymer, which is to be incorporated in low plasticity Buna-S type synthetic rubber for improving its processing characteristics, will impart too fast a curing rate of a compound of said rubber if it contains alkali metal hydroxides. A liquid polymer which is to be used as a drying oil should not contain any substantial amount of alkali metal or alkali metal compounds as these tend to render the liquid cloudy and cause undesirable reactions when compounding these oils in paints, various types of varnishes and protective surface coatings and adhesive formulations.

It is known in the art to treat alkali metal catalyzed polymers, to remove alkali metal impurities therefrom, with alcohol or with water or with dilute (aqueous) acid solutions, to destroy the alkali metal impurities and effect some degree of removal of the said impurities from the polymer. However, it has been found that neither water nor dilute aqueous acids alone will produce a polymer which is substantially ash-free. What is not generally understood is that a large proportion of the alkali metal from such a polymerization is present in the form of addition products with the polymerized monomers. The alkali metal held in this form reacts with water or dilute aqueous acid solutions only with great difficulty. When attempting to use a low molecular weight alcohol to destroy and remove the alkali metal impurities from the polymer, a stable emulsion is formed so that only very incomplete removal is possible. Also, when employing water or dilute aqueous acid alone, extensive agitation is necessary in order to achieve reaction, with the result that emulsification takes place to an unduly large degree.

By the term alkali metal impurities, employed herein, it is meant to include free alkali metal and/or organo alkali metal compounds formed during the polymerization and present in the polymer product, and also organo alkali metal compounds employed as catalysts, such as sodium butyl, sodium triphenyl methyl, and the like, and alkali metal hydrides. These latter compounds are exemplary of catalysts within the group consisting of the alkali metals, the alkali metal hydrides, the alkali metal alkyls, and the alkali metal aryls. Any of the above-mentioned type materials, i. e. free alkali metals such as sodium, potassium, or lithium, and/or the defined organo alkali metal compounds, when present in the polymer product comprise the said "alkali metal impurities," removed from the polymer in accordance with this invention.

In accordance with my invention alkali metal impurities present in polymer product of alkali metal catalyzed polymerization of a diene are removed by treating the polymer under contacting conditions with known treating agents such as water, aqueous fatty acids, aqueous mineral acids, alcohol, aqueous alcohol, or mixtures of such agents, in the presence of an emulsion-breaker or deemulsifier, under which conditions the alkali metal impurities are removed from the polymer and accumulated in the treating agent phase, and efficient separation of polymer and treating agent phase occurs to provide for recovery of purified polymer product in high yield.

In accordance with a now preferred embodiment, an alcohol, preferably one containing not more than four carbon atoms per molecule, such as methanol, ethanol, 1-propanol, 2-propanol, 1-butanol, 2-butanol, 2-methyl-1-propanol, 2-methyl-2-propanol, propylene glycol and butylene glycol, is added to the alkali-metal impurity-containing polymer product "to destroy" any free metal present; the polymer is then washed with water, or washed first with a dilute aqueous acid such as 2 to 5 percent sulfuric acid and then with water, in either case in the presence of a suitable emulsion breaker.

In the practice of other embodiments, the said impurity-containing polymer is washed alone with an aqueous alcohol, aqueous acid, or water, or any mixture of such aqueous agents, in any event in the presence of an emulsion-breaker.

Aqueous acids employed are any suitable aqueous mineral or fatty acids such as acetic acid, sulfuric acid, hydrochloric acid, hydrofluoric and nitric acids, and the like.

My invention applies to polymers made by the solution polymerization of a diene, such as the conjugated dienes, 1,3-butadiene, isoprene, 2,3-dimethyl-1,3-butadiene, chloroprene, and the like, either alone or in admixture with each other and/or with other monomers copolymerizable therewith such as styrene, vinyl pyridine, methyl styrene, vinyl-naththalene, and the like.

Illustrative of one manner in which an alkali metal catalyzed polymerization of a diene is conducted to produce a polymer, and also illustrative of treatment of resulting polymer to remove alkali metal impurities therefrom, imparted to the polymer during the polymerization reaction, a dispersion of metallic sodium in xylene is charged to a reactor containing a suitable solvent, such as n-heptane, pentane, hexane, cyclohexane, benzene, toluene, xylene, or the like, the reactor having been previously flushed with butadiene vapors. An initial charge of butadiene is then added to the reactor at the reaction temperature which can be approximately 200° F. until initial reaction takes place, as evidenced by temperature rise and pressure drop. Butadiene feed is then continued at a rate sufficient to maintain the reaction temperature at the constant desired level, employing cooling to aid in effecting temperature control, when desired. Upon terminating feed of butadiene to the reactor, additional time, such as about ten minutes, is allowed for completion of the reaction. Effluent from the reactor comprises a solution, e. g., n-heptane, of polymer product together with any unreacted monomer, free metallic catalyst, and the like. It is preferable to decant the polymer-containing effluent to separate same from free metal catalyst, and to flash same so as to remove any remaining unreacted monomer. The resulting solution is then subjected to purification, i. e., to remove alkali metal impurities therefrom in accordance with the process of this invention. This can be done by adding the emulsion-breaker directly to the said solution and then admixing the treating agent therewith and maintaining contact of treating agent with polymer solution under agitation conditions. This contacting can be carried out in any suitable manner, such as by stirring the resulting admixture.

In one form of this invention, a low molecular weight alcohol, such as methanol, is added to the reactor contents prior to withdrawal of effluent so as to "destroy" remaining free metal; and the solution withdrawn as above described, is then water washed or first washed with dilute acid, in any event all washings of the polymer-containing solution being conducted in the presence of a suitable emulsion-breaker. In this manner thorough washing of the polymer solution is effected without the formation of stable emulsions. Indeed, in the presence of an emulsion breaker, as described, a much more thorough washing is effected than is possible in the absence of the emulsion-breaker, i. e. in the presence of the latter, formation of stable emulsions is prevented and any emulsions formed break readily. Thus, when washing with an aqueous agent, for example, water, or an aqueous sulfuric acid, or the like, according to this invention, relatively severe agitation can be carried on to effect otherwise difficult reaction of organoalkali metal compounds, in the polymer, with the aqueous treating agent, without the formation of stable emulsions taking place and with the rapid breaking of any emulsions that may be formed. Purified polymer phase, thus efficiently separated from the treating agent phase, can thereby be recovered in high yield and purity, i. e., it is a clearer product and has a markedly lowered ash relative to the polymer product obtained in the absence of an emulsion-breaker.

It is to be understood that in accordance with the basic concept of this invention, the defined polymer treatment is effected in the presence of any suitable emulsion-breaker or mixture of such emulsion breakers.

However, in a now preferred form, I employ at least one of a group consisting of hydrophile oxyalkylated phenol-aldehyde resins such as those described in U. S. 2,626,942, issued January 27, 1953, to Melvin De Groote, hydrophile oxyalkylated synthetic resins such as those described in U. S. 2,499,365, issued March 7, 1950, to Melvin De Groote et al., high molecular weight inorganic esters of polyoxyalkylene compounds having a terminal hydroxyl group, as disclosed in U. S. 2,654,714, issued October 6, 1953, to Willard H. Kirkpatrick, molecularly dehydrated condensation products of the reaction of zinc chloride with an alkylolamine as disclosed in U. S. 2,615,852, October 28, 1952, to Earl T. Kocher, condensation products of a modified alkylolamine and a detergent forming body containing at least 8 carbon atoms in a hydrocarbon structure, as described in U. S. 2,568,738, September 25, 1951, to Willard H. Kirkpatrick, modified alkyd resins derived from the reaction of a polybasic acid, a mixed ester and an alkylolamine, as described in U. S. 2,568,739, September 21, 1951, to Willard H. Kirkpatrick et al., modified resins derived from the reaction of a blown tall oil, triethanolamine, an acidic salt of a metal forming an amphoteric hydroxide and a mixed ester resulting from the reaction of a polyhydric alcohol and a mixture of at least two dissimilar unsaturated carboxyacids, as described in U. S. 2,568,741, September 25, 1951, to Willard H. Kirkpatrick et al., condensation reaction products of an alkanolamine containing at least two hydroxy groups in its molecule and a mixture of at least two dissimilar unsaturated monocarboxy acids, as disclosed in U. S. 2,568,743, September 25, 1951, to Willard H. Kirkpatrick, and compounds from the group consisting of alkenyl succinic acids, their esters and salts of said acids and esters as disclosed in U. S. 2,568,746, September 25, 1951, to Willard H. Kirkpatrick et al., as emulsion-breakers, in accordance with my invention as described.

I have further discovered that various deemulsifier materials commercially available and identified only in accordance with their trade names are especially suitable in the practice of this invention, such as "Dehydro 4325," "Tret-O-Lite DS-415" (the Tret-O-Lite Company), "Visco 94" and "Visco 97" (Visco Products Company).

Although the emulsion-breaker is preferably incorporated into the polymer to be treated prior to contact of the latter with the treating agent, it can be incorporated into the treating agent-polymer admixture in any desired manner, such as in admixture with the treating agent or by addition directly to the treating agent-polymer admixture.

Temperatures, particularly suitable for contacting polymer with treating agent in the presence of the deemulsifier, or emulsion-breaker, are generally within the range of 50 to 200° F., although somewhat higher or lower temperatures can be employed dependent upon the specific emulsion-breaker and treating agent employed.

The concentration of emulsion-breaker in the polymer-treating agent admixture, based on the polymer content of the hydrocarbon phase treated is generally within the range of from about 0.03 to 0.3 weight percent although concentrations outside this range can be employed dependent upon the specific emulsion-breaker material utilized.

The time generally required for effecting satisfactory washing of the polymer product, i. e., treatment of hydrocarbon phase with treating agent in the presence of an emulsion-breaker material is generally from 10 to 90 minutes; an extended wash period generally being not required, although this period is dependent upon, in any specific instance, the emulsion-breaker and treating agent employed, as well as the efficiency of mixing in the washing step. After this washing step the mixture is allowed to stand until substantially complete phase separation has occurred. Generally this requires from 5 to 120 minutes, depending upon the type and concentration of emulsion breaker employed, and upon the characteristics of the particular polymer being processed.

My invention is illustrated with reference to the following examples:

Example I

Metallic sodium (2.2 pounds) and xylene (1.5 gallons) were charged to a catalyst preparation vessel where the sodium was first melted, then dispersed into the xylene by means of a high speed stirrer. N-heptane (45 gallons) was transferred to a reactor and heated to about 200° F. The reactor was flushed twice with butadiene vapors; then the xylene-sodium mixture was charged to the vessel. The initial charge of butadiene—approximately 10 pounds— was next added, and the temperature of the reaction vessel was held at 200° to 210° F., until the initial reaction took place; this was evidenced by both a rapid rise in temperature and a drop in pressure. As soon as the temperature of the reaction mixture had dropped to about 210° F., the butadiene feed was continued. Butadiene was then fed to the reactor rapidly enough to keep the reaction temperature constant at about 210° F.; cooling tower water was used to cool the reactor jacket. About 204 pounds of butadiene was polymerized in 1.7 hours under these conditions. After the butadiene feed was terminated, about 10 minutes was allowed for completion of the reaction; then one gallon of methanol was charged to the reactor for the purpose of combining with the residual sodium to "kill" or destroy same thereby stopping the reaction.

250 volumes of reactor effluent from the above-described run were admixed with 250 volumes of hot water in the presence of two different commercially available emulsion-breakers, namely Dehydro 4325 and Tret-O-Lite DS-415, and resulting admixture was shaken and then allowed to stand for at least 20 minutes, as indicated in the following tabulation. The degree of separation and the volume per cent of the hydrocarbon phase recovered are set forth in the said tabulation, as follows:

| | Dehydro #4325 | | | | Tret-O-Lite DS-415 | | |
|---|---|---|---|---|---|---|---|
| Weight percent emulsion breaker, based on polybutadiene. | 0.0028 | 0.0057 | 0.0288 | 0.0576 | 0.0139 | 0.0277 | 0.0462. |
| Settling time, min | 40 | 20 | 20 | 20 | 20 | 20 | 20. |
| Volume percent hydrocarbon phase recovered. | 92 | 82 | 100 | 100 | 94 | 100 | 100. |
| Characteristics of separation | poor | fair | very good | immediate | fair | good | good. |

In the absence of the emulsion breaker in the above mixtures, i. e., Dehydro 4325 and Tret-O-Lite DS-415, the mixtures as prepared each gave an emulsion which was stable, i. e., substantially no separation of phases taking place, for periods exceeding one hour.

*Example II*

Polybutadiene reactor effluent, such as that of Example I was washed with equal volumes of 5 percent aqueous sulfuric acid in one run, and of water in another run, the latter containing from 1–2 drops of Dehydro 4325. The relative ash contents of polymer recovered are shown in the following tabulation:

| | $H_2SO_4$ washed | Water wash containing Dehydro 4325 |
|---|---|---|
| Percent ash in flashed product | 0.122 | 0.036 |

The foregoing examples illustrate that when employing an emulsion breaker in accordance with my invention, i. e., in conjunction with conventional treatment of the defined polymer with a treating agent to remove alkali metal impurities therefrom, markedly improved separation of phases is obtained together with recovery of polymer product in higher yield and improved purity (lower ash content) than obtained heretofore in accordance with such known treating procedures.

This invention is particularly advantageously applied to the purification of polymer product of alkali metal catalyzed polymerization of a conjugated diene to produce a liquid polybutadiene, such as in accordance with the process disclosed and claimed in U. S. Patent 2,631,175, of Willie W. Crouch, issued March 10, 1953.

By way of further example, in accordance with one specific purification procedure advantageously employed, reactor effluent, from alkali metal catalyzed solution polymerization of 1,3-butadiene to produce liquid polybutadiene, is admixed with 0.05 weight percent Tret-O-Lite (based on the polybutadiene content). The resulting admixture is washed with about an equal volume of 5 percent aqueous sulfuric acid, the acid layer is withdrawn, and the remaining polymer-containing layer is washed with water for one hour on a continuous basis (replacing wash water with fresh water). The final water layer is separated from polymer layer, and the polymer-containing phase is then ready for final stripping and flashing operations for recovery of purified polybutadiene.

Volume ratios of aqueous treating agent and polymer phase are generally respectively from 0.5:1 to 5:1, although any suitable proportions can be employed dependent upon the specific treating agent, emulsion-breaker material, and the like, employed.

The concentration of acid in aqueous acid may vary over a wide range, as for example, from 0.5 to 10 weight percent. The concentration of aqueous alcohol may likewise vary over a wide range, as from 5 to 75 weight percent.

When admixing an alcohol with ploymer solution phase, i. e., with the reactor contents or in any case with the polymer-containing phase prior to treatment of the latter with aqueous agent, the amount of alcohol so employed is preferably from 0.01 to 0.1 volumes per volume of solution phase, although proportions outside this range can be employed if desired. The term "polymer solution phase" referred to hereinabove is inclusive of any alcohol added thereto prior to treatment of the polymer with aqueous agent.

As stated hereinabove, in the practice of this invention the formation of a stable emulsion is prevented whereby efficient separation and recovery of polymer phase is achieved. However, in some instances an unstable emulsion may be formed but it is rapidly and efficiently broken, in the presence of an emulsion-breaker, to provide for efficient and rapid separation of polymer and aqueous phases therefrom. Thus, a short settling time may in some instances be advantageously utilized for permitting such rapid separation of phases from the unstable emulsion, such as from 5 to 120 minutes.

Although I have described my invention in terms of adding the emulsion-breaker to the polymer-aqueous agent admixture, or to the polymer or to the aqueous agent prior to admixing these materials, the emulsion-breaker can be added to polymer which is emulsified with aqueous treating agent subsequent to polymer-aqueous agent contacting. Thus in accordance with a broad concept, the emulsion-breaker is incorporated into such polymer at any time that it is emulsified with an aqueous treating agent.

The emulsions encountered in the process of this invention are usually of the water-in-oil type, and it is therefore generally preferred to employ emulsion breakers designed specifically for the purpose of breaking water-in-oil emulsions. However, certain emulsion breakers are effective in either water-in-oil or oil-in-water emulsions, and my invention is not limited to the use of emulsion breakers of water-in-oil type, nor to the treatment of water-in-oil type emulsions of polymers of the type described.

Emulsion breakers of the kind useful in the process of this invention are often used in admixture with aromatic hydrocarbon solvents such as benzene, xylenes, cumene and the like, and such use is within the scope of my invention.

Reasonable variation and modification are possible within the scope of the foregoing disclosure and the appended claims to the invention, the essence of which is that in the separation of alkali metal impurities from polymer product of an alkali metal catalyzed polymerization of a conjugated diene by treating said polymer with an aqueous treating agent, wherein emulsification takes place to impair separation of aqueous and polymer phases thereby preventing efficient recovery of purified polymer, the improvement has been provided which comprises incorporating an emulsion-breaker into polymer which is emulsified with said aqueous agent, thereby providing for efficient separation and recovery of purified polymer.

I claim:

1. In the separation of alkali metal impurities from polymer product of an alkali metal catalyzed polymerization of a conjugated diene by treating the said polymer with an aqueous treating agent, wherein emulsification takes place to impair separation of aqueous and polymer phases, thereby preventing efficient recovery of purified polymer, the improvement comprising incorporating an emulsion breaker into polymer which is emulsified with said aqueous agent, thereby providing for efficient separation of purified polymer.

2. The improvement of claim 1 wherein said emulsion breaker is selected from the group consisting of hydrophile oxyalkylated phenol-aldehyde resins; hydrophile oxyalkylated synthetic resins; high molecular weight inorganic esters of polyoxyalkylene compounds having a terminal hydroxyl group; molecularly dehydrated condensation products of the reaction of zinc chloride with an alkylolamine; condensation products of a modified alkylolamine and a detergent forming body containing at least 8 carbon atoms in a hydrocarbon structure; modified alkyd resins derived from the reaction of a polybasic acid, a mixed ester and an alkylolamine; modified resins derived from the reaction of a blown tall oil, triethanolamine, an acidic salt of a metal forming an amphoteric hydroxide and a mixed ester resulting from the reaction of a polyhydric alcohol and a mixture of at least two dissimilar unsaturated carboxy acids; condensation reaction products of an alkanolamine containing at least two hydroxy groups in its molecule and a mixture of at least two dissimilar unsaturated monocarboxy acids; and compounds from the group consisting of alkenyl succinic acids, their esters and salts of said acids and esters.

3. The improvement of claim 1 wherein said aqueous treating agent comprises at least one compound selected from the group consisting of an alcohol, an acid, and water.

4. In the separation of sodium impurities from liquid polymer product of sodium catalyzed polymerization of 1,3-butadiene, wherein said liquid polymer is contacted with at least one aqueous treating agent selected from the group consisting of an alcohol, an acid, and water, to react said impurities with said aqueous agent and to cause removal of resulting product of reaction from polymer phase into aqueous phase, and wherein emulsification takes place to impair separation of aqueous and polymer phases thereby preventing efficient recovery of purified polymer, the improvement comprising incorporating an emulsion breaker into the admixture of aqueous and polymer phases in an amount sufficient to break emulsion resulting from said emulsification, thereby providing for efficient separation and recovery of purified polymer phase, unimpaired by emulsification, and recovering polymer phase.

5. A process comprising admixing from 0.01 to 0.1 volumes of an alcohol containing from 1 to 4 carbon atoms in the molecule, with one volume of a polymer solution phase recovered from effluent from sodium catalyzed solution polymerization of 1,3-butadiene to form a liquid polybutadiene, whereby an aqueous polymer emulsion is formed, adding to the resulting emulsion from 0.03 to 0.3 weight percent of an emulsion-breaker material to the resulting alcohol-polymer solution admixture, based on the said polymer solution, contacting under agitation conditions from 0.5 to 5 volumes of aqueous treating agent comprising at least one selected from the group consisting of an alcohol, an acid and water, with one volume of said alcohol-polymer-emulsion-breaker solution, at a temperature of from 50° to 200° F. for a period of from 10 to 90 minutes, settling resulting polymer-treating agent admixture for a period of from 5 to 120 minutes, then separating hydrocarbon phase therefrom, and recovering said polymer, said emulsion breaker material being at least one selected from the group consisting of hydrophile oxyalkylated phenol-aldehyde resins; hydrophile oxyalkylated synthetic resins; high molecular weight inorganic esters of polyoxyalkylene compounds having a terminal hydroxyl group; molecularly dehydrated condensation products of the reaction of zinc chloride with an alkylolamine; condensation products of a modified alkylolamine and a detergent forming body containing at least 8 carbon atoms in a hydrocarbon structure; modified alkyd resins derived from the reaction of a polybasic acid, a mixed ester and an alkylolamine; modified resins derived from the reaction of a blown tall oil, triethanolamine, an acidic salt of a metal forming an amphoteric hydroxide and a mixed ester resulting from the reaction of a polyhydric alcohol and a mixture of at least two dissimilar unsaturated carboxy acids; condensation reaction products of an alkanolamine containing at least two hydroxy groups in its molecule and a mixture of at least two dissimilar unsaturated monocarboxy acids; and compounds from the group consisting of alkenyl succinic acids, their esters and salts of said acids and esters.

6. The process of claim 5 wherein said alcohol added to said polymer solution is methanol and wherein said aqueous treating agent is aqueous 2–5 weight percent sulfuric acid.

7. The process of claim 6 wherein, subsequent to said contacting with aqueous sulfuric acid, polymer solution phase is washed with water.

8. In the separation of alkali metal impurities from polymer product of an alkali metal catalyzed polymerization of a conjugated diene by treating the said polymer with an aqueous treating agent, wherein emulsification takes place to impair separation of aqueous and polymer phases, thereby preventing efficient recovery of purified polymer, the improvement comprising incorporating an emulsion-breaker into polymer which is emulsified with said aqueous agent in an amount sufficient to break said emulsion, settling resulting admixture of polymer-treating agent-emulsion-breaker for a period sufficient to permit separation of polymer and aqueous phases, and then recovering separated polymer phase.

References Cited in the file of this patent

UNITED STATES PATENTS

| | | |
|---|---|---|
| 2,209,746 | Ebert | July 30, 1940 |
| 2,468,330 | Kropa | Apr. 26, 1949 |
| 2,543,440 | Crouch | Feb. 27, 1951 |
| 2,652,424 | De Groote | Sept. 15, 1953 |
| 2,679,521 | De Groote | May 25, 1954 |
| 2,712,561 | Gleason | July 5, 1955 |